March 17, 1931. K. IMHOFF ET AL 1,797,147
AERATION TANK FOR SEWAGE TREATMENT BY ACTIVATED SLUDGE
Filed Feb. 8, 1926
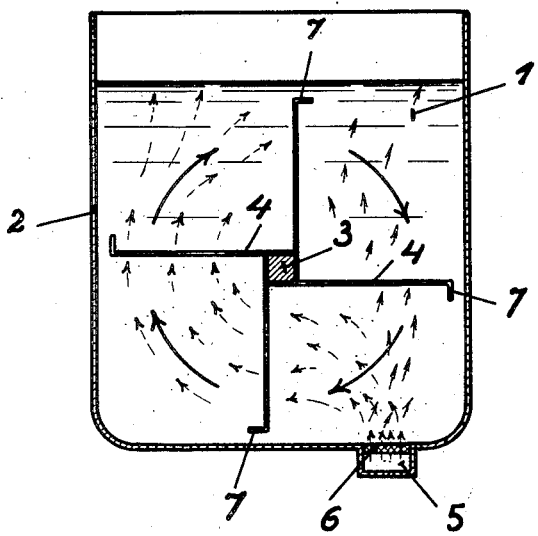

Patented Mar. 17, 1931

1,797,147

UNITED STATES PATENT OFFICE

KARL IMHOFF, FRANZ FRIES, AND FRIEDRICH SIERP, OF ESSEN, GERMANY; SAID FRANZ FRIES AND FRIEDRICH SIERP ASSIGNORS TO SAID KARL IMHOFF

AERATION TANK FOR SEWAGE TREATMENT BY ACTIVATED SLUDGE

Application filed February 8, 1926, Serial No. 86,965, and in Germany February 20, 1925.

The conventional sewage treatment by activated sludge is generally employed in two different forms, namely, either by using artificially produced compressed air for the aeration, or by mere surface aeration. In the latter case, the sewage is agitated by mechanical contrivances such as paddles, stirring devices, or the like, so that the continuously renewed sewage surface takes-up oxygen from the atmosphere. Said latter process has the drawback that the oxygen reception at the sewage surface is imperfect whereby the purification of the sewage takes considerably longer time than with the employment of the compressed air process.

To improve the sewage treatment by activated sludge, the present invention provides a combination of the surface aeration process in aeration tanks and of the compressed-air process in such a way that, compressed-air is supplied to the sewage in the tank at a place where the vertical ascension of the air bubbles due to their natural buoyancy is directed opposite to the downwardly directed current of the sewage produced during the agitation of the latter for its surface aeration, whereby said bouyancy is practically neutralized and the air is compelled to take a circuitous (indirect) way through the tank to the sewage level therein. In this manner, the compressed-air remains in longer contact with the sewage to be treated, whereby the oxygen reception of the latter within the tank and thus the whole aeration are advantageously increased.

The accompanying drawing illustrates, by a vertical section through an aeration tank, how the invention can be put into practice.

The sewage 1 to be treated flows continuously or at intervals through the aeration tank 2. In the longitudinal direction of the latter, a power-driven horizontal shaft 3 is rotatable in the direction of the large arrows and fitted with paddles 4, by which the sewage is set in circulation for its continuous surface aeration.

At a place in the bottom of the tank 2 where the circulating sewage descends, a small quantity of finely distributed compressed air is supplied through a channel 5 and filter partitions 6, perforated pipes, or the like porous contrivances.

The air entering through 6 and tending by its natural buoyancy to ascend in vertical direction, is met by the downwardly directed current of the circulating sewage and by the paddles 4 producing the latter, whereby its buoyancy is practically neutralized and the air is compelled to take a circuitous way through the tank 2 to the sewage level therein, as indicated by the small dotted arrows in the illustration.

With the construction illustrated the air entering through the bottom of the tank not only tends to be deflected by the panels 4 so as to take a more circuitous and indirect path through the sewage 1 but also in case any of the air should rise straight up in the liquid contained in the tank 2, its rate of flow is materially retarded by the paddle blades 4; thus the air bubbles remain for a longer period in the sewage and have correspondingly more effect.

Rectangular bends 7 at the paddle ends pointing in the direction of the flow of the current, assist in said action.

To further retard the flow of the supplementary compressed-air through the tank, the paddles may consist of sievelike material, whereby the sewage is still more intimately mixed with the air.

What we claim, is:

1. In apparatus for the purification of sewage by activated sludge, an aeration tank for the sewage provided with a power-driven agitator having parts to set up a circulation of the sewage in the tank in one direction, and means associated with the tank for directing a stream of compressed air into the sewage circulation and in a direction moving opposite to the movement of the sewage circulation and the parts of the agitator impelling the sewage circulation, so that the compressed air will have a longer contact time with the sewage and pass more slowly through the sewage, allowing the oxygen in the air to keep the sludge alive to complete sewage purification by the activated sludge.

2. In combination, an aeration tank for the purification of sewage by activated sludge, an agitator in the tank for effecting a sewage circulation descending in one part of the tank having continuous surface aeration, means associated with the tank to provide an inflow of ascending compressed air directed opposite to the descending sewage circulation and into the descending sewage circulation, said agitator comprising a rotatable power-driven horizontal shaft arranged in the longitudinal direction of the tank, fixed paddles on said shaft, and rectangular bends at the free ends of the paddles pointing in the direction of rotation of the paddles to descend into the ascending compressed air.

3. In apparatus for the purification of sewage by activated sludge, an aeration tank for the sewage, an agitator in the tank, operative to set up a circulation of the sewage therein in a positive descending current, and means associated with the tank to direct a stream of compressed air upwardly against and into the descending current of sewage circulation, so that through the resistance afforded by the descending current of sewage to the stream of compressed air, to cause the compressed air to have a longer contact time with the sewage and hence allow the oxygen in the air to keep the sludge alive and complete sewage purification by the activated sludge.

In testimony whereof we have hereunto set our hands.

KARL IMHOFF.
FRANZ FRIES.
FRIEDRICH SIERP.